United States Patent
Mamadapur et al.

(10) Patent No.: US 11,544,261 B2
(45) Date of Patent: Jan. 3, 2023

(54) SYSTEM FOR OPTIMIZING ELECTRONIC DATA REQUESTS IN A DATA STORAGE ENVIRONMENT

(71) Applicant: BANK OF AMERICA CORPORATION, Charlotte, NC (US)

(72) Inventors: Krishna Rangarao Mamadapur, Pune (IN); Jigesh Rajendra Safary, Mumbai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/060,189

(22) Filed: Oct. 1, 2020

(65) Prior Publication Data
US 2022/0107950 A1   Apr. 7, 2022

(51) Int. Cl.
*G06F 16/00* (2019.01)
*G06F 16/2453* (2019.01)
*G06F 16/21* (2019.01)

(52) U.S. Cl.
CPC ...... *G06F 16/24542* (2019.01); *G06F 16/217* (2019.01)

(58) Field of Classification Search
None
See application file for complete search history.

(56) References Cited

U.S. PATENT DOCUMENTS

| | | | |
|---|---|---|---|
| 5,715,450 A | 2/1998 | Ambrose et al. | |
| 6,178,425 B1 | 1/2001 | Brodersen et al. | |
| 6,275,818 B1 | 8/2001 | Subramanian et al. | |
| 6,363,371 B1 | 3/2002 | Chaudhuri et al. | |
| 6,529,901 B1 | 3/2003 | Chaudhuri et al. | |
| 7,113,993 B1 | 9/2006 | Cappiello et al. | |
| 7,430,562 B1 | 9/2008 | Bedell et al. | |
| 7,529,728 B2 | 5/2009 | Weissman et al. | |
| 8,386,471 B2 | 2/2013 | Collins et al. | |
| 8,447,754 B2 | 5/2013 | Weissman et al. | |
| 8,543,566 B2 | 9/2013 | Weissman et al. | |
| 8,655,867 B2 | 2/2014 | Collins et al. | |
| 9,286,343 B2 | 3/2016 | Kim et al. | |
| 9,886,483 B1 | 2/2018 | Harrison et al. | |
| 9,946,751 B2 | 4/2018 | Eidson et al. | |
| 10,152,511 B2 | 12/2018 | Rajan et al. | |
| 10,324,946 B2 | 6/2019 | Janson et al. | |
| 10,565,201 B2 | 2/2020 | Beavin et al. | |
| 10,685,134 B1 | 6/2020 | Strahan | |
| 10,726,006 B2 | 7/2020 | Le et al. | |
| 11,075,951 B1* | 7/2021 | Kats | H04L 63/20 |
| 2005/0165741 A1* | 7/2005 | Gordon | G06F 16/217 |
| 2006/0173852 A1* | 8/2006 | Bestgen | G06F 16/20 |

(Continued)

*Primary Examiner* — Augustine K. Obisesan
(74) *Attorney, Agent, or Firm* — Moore & Van Allen PLLC; Nicholas C. Russell (57) ABSTRACT

A system for optimizing data requests in an electronic data storage environment may be configured to receive and identify data requests to perform operations on data stored in a data storage environment. The system may further to implement tuning algorithms on the data requests upon identifying that the data requests are causing the data storage environment to perform below optimal performance. The present invention may be implemented as a system, a computer program product, or a computer-implemented method.

11 Claims, 5 Drawing Sheets

(56) References Cited

U.S. PATENT DOCUMENTS

| | | | |
|---|---|---|---|
| 2010/0198811 A1* | 8/2010 | Wiener | G06F 16/24549 |
| | | | 707/718 |
| 2010/0235349 A1* | 9/2010 | Kuno | G06F 16/217 |
| | | | 707/718 |
| 2012/0191641 A1* | 7/2012 | Crupi | G06F 16/21 |
| | | | 707/602 |
| 2014/0188532 A1* | 7/2014 | Liu | G06F 16/24547 |
| | | | 705/7.12 |
| 2014/0310249 A1* | 10/2014 | Kowalski | G06F 16/9535 |
| | | | 707/688 |
| 2016/0098448 A1* | 4/2016 | McShane | G06F 16/24534 |
| | | | 707/713 |
| 2016/0253377 A1* | 9/2016 | Ford | G06F 16/2453 |
| | | | 707/768 |
| 2016/0306847 A1* | 10/2016 | Ding | G06F 9/4552 |
| 2020/0019633 A1* | 1/2020 | Kathirvel | G06N 20/00 |
| 2020/0134070 A1* | 4/2020 | Sidoti | G06F 16/23 |

\* cited by examiner

SYSTEM FOR OPTIMIZING ELECTRONIC DATA REQUESTS IN A DATA STORAGE ENVIRONMENT

FIELD OF THE INVENTION

The present disclosure embraces a system, computer program product, and computer-implemented system and method for optimizing data requests in a data storage environment.

BACKGROUND

Enterprise data storage systems are designed to process a large number of data requests from entities within the enterprise. The large number of requests require that the enterprise data storage system operate and process the requests in an efficient and timely manner in order to ensure proper functioning of the enterprise systems. There is a need for enterprise data storage systems that can automatically implement tuning methods in order to improve the efficiency and timeliness when executing data requests.

BRIEF SUMMARY OF THE INVENTION

The following presents a simplified summary of one or more embodiments of the invention in order to provide a basic understanding of such embodiments. This summary is not an extensive overview of all embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, computer program products, and methods for optimizing data requests in a data storage environment. Embodiments of the present invention comprise one or more processor components, one or more memory components operatively coupled to the one or more processor components, and computer-readable instructions stored on the one or more memory components configured to receive one or more data requests to receive one or more data requests, wherein a data request is a request to perform an operation on data stored in a data storage environment; capture one or more data request performance parameters associated with the one or more data requests; capture one or more data request parameters associated with the one or more data requests; identify at least one of the one or more data requests that is performing below an optimal performance; and apply a tuning algorithm to the one or more identified data request.

In some embodiments of the invention, the tuning algorithm comprises at least one of adding one or more indices to the electronic data storage environment, restructuring one or more data requests, or creating a new data storage environment parameter set.

In still other embodiments of the invention, identifying at least one of the one or more nodes that is performing below an optimal performance further comprises implementing natural language processing on the one or more data requests.

In still other embodiments of the invention, identifying at least one of the one or more nodes that is performing below an optimal performance further comprises performing one or more simulations on an alternative data request that would yield more optimal performance.

In still other embodiments of the invention, capturing one or more data request performance parameters comprises capturing a total elapses runtime associated with the one or more data requests.

In still other embodiments of the invention, the system is further configured to generate a report and display the report on a user display.

BRIEF DESCRIPTION OF THE DRAWINGS

Having thus described embodiments of the invention in general terms, reference will now be made the accompanying drawings, wherein:

DETAILED SUMMARY OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the extended recognition system described herein is implemented. The entity may be a business organization, a non-profit organization, a government organization, and the like.

"Entity system" as used herein may refer to the computing systems and/or other resources used by the entity to execute data request operations in a data storage environment.

"User" as used herein may refer to an individual who may interact with the entity system. Accordingly, the user may be an employee, associate, contractor, or other authorized party who may access, use, administrate, maintain, and/or manage the computing systems within the entity system.

A "user interface" is any device or software that allows a user to input information, such as commands or data, into a device, or that allows the device to output information to the user. For example, the user interface comprises a graphical user interface (GUI) or an interface to input computer-executable instructions that direct a processing device to carry out specific functions. The user interface typically employs certain input and output devices to input data received from a user second user or output data to a user. These input and output devices may comprise a display, mouse, keyboard, button, touchpad, touch screen, microphone, speaker, LED, light, joystick, switch, buzzer, bell, and/or other user input/output device for communicating with one or more users.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

"Data Storage Environment" refers to a structured repository for data storage, such as a database.

"Data Request" as used herein may refer to a function, which may be generated by user action or automatically by a computing system, to perform operations on data stored in a data storage environment. In some instances, a "data request" may comprise a "query" and be referred to herein as such. A "data request" in an exemplary embodiment as described herein comprises at least an operator (e.g., SELECT, WHERE, FROM, etc.), a "predicate" (i.e., the string following the operator), and a "literal" (i.e., the value upon which the operations will be compared). A query predicate literal can be either a value or a parameterized variable.

"Resource" as used herein may refer an object which is typically transferred between the third party and the entity. The object may be tangible or intangible objects such as computing resources, data files, documents, funds, and the like.

Embodiments of the present disclosure provide a system, computer program product, and method for optimizing data requests in a data storage environment. In particular, the system may be configured to apply tuning algorithms to one or more data requests within a data storage environment in order to improve data the performance of the data storage environment (such as data request runtime and CPU capacity). For example, the systems described herein may create additional indices, restructure data requests, and/or create new data storage environment parameter sets.

In general, the data storage environments as described herein are comprised of a on or more databases, data tables (which may be indexed or non-indexed), and other data elements as may be required by an entity.

Figure 1:
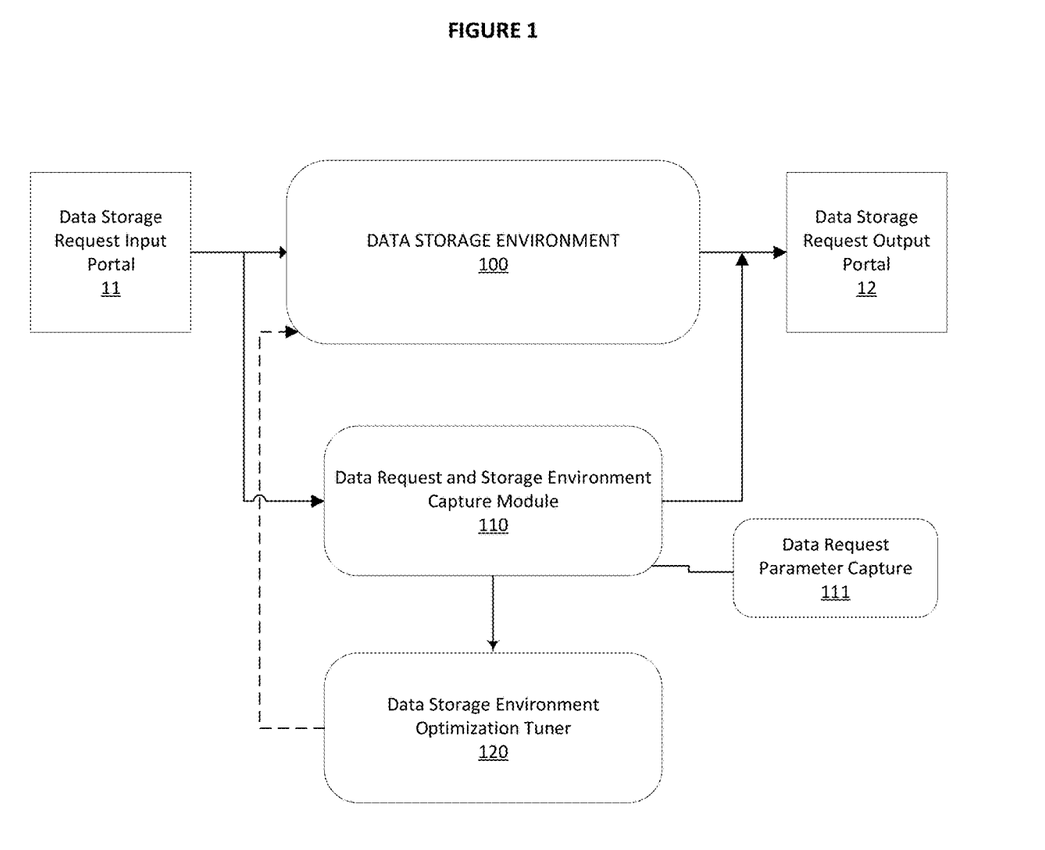
FIG. 1 is a system diagram depicting an exemplary embodiment of the invention.

FIG. 1 depicts an exemplary embodiment of the system in accordance with embodiments of the invention. As shown in FIG. 1, the system comprises a data storage environment 100, a data request and storage environment capture module 110, a data request parameter capture module 111, a data storage environment optimization tuner 120, a data request input portal 11, and a data request output portal 12.

As noted above, the data storage environment comprises one or more data storage elements that are structured for storing data. Data storage environment 100 in accordance with embodiments of the present invention may be comprised of one or more databases. The data storage environment 100 can be configured to receive and process one or more data requests, which are operations that can be performed on the data stored within the data storage environment 100. Data storage requests may be configured to provide a user or a user computing system with a particular subset of the data stored within the data storage environment 100.

The data request and storage capture module 110 is a module with the system of the present invention that is configured to capture operating parameters of the data storage environment 100 in order to monitor the performance of the data storage environment. The data request and storage capture module 110 can be configured to capture the elapsed time for particular data requests (i.e., the time elapsed from the time a data request is received through the data request input portal 11 until the requested operation is performed and transmitted through the data request output portal 12). The data request and storage capture module 110 may also be configured to capture CPU time and/or CPU usage (i.e., the amount of processing time and/or processing power required by the data storage environment to perform a data request).

As shown in FIG. 1, the data request and storage capture module 110 may work in parallel with a data request parameter capture module 111. The data request parameter capture module 111 is responsible for capturing the relevant information associated with each data request. For example, the data request parameter capture may capture the applicable operator (e.g., SELECT, WHERE, FROM, MERGE, etc.), the predicate and literal values associated with each query input into the data storage environment 100.

The data request and storage capture module 110 and data request parameter module work in sync in order to associate the applicable data request parameters with the applicable operating parameters. In this regard, the data requests and storage capture module 110 and data request parameter capture module 111 may combine the applicable data into a table that comprises rows of data request parameters and columns of operating parameters. This will permit the system to identify which data request parameters may lead to suboptimal performance of the data storage environment 100.

In addition, the data request and storage capture module 110 and data request parameter capture module 100 may be used to identify either particular data requests that cause suboptimal performance or types of data requests that cause suboptimal performance. In this sense, the optimization algorithms discussed below may be configured to optimize a particular data request (e.g., a frequently run query that has a high run time) or a particular type of data request that degrades performance (e.g., an operation that overuses CPU resources).

As shown in FIG. 1, the system also comprises a data storage environment optimization tuner 120, or "optimization tuner" for short. The optimization tuner 120 is responsible for analyzing the data parameter data obtained by the data request and storage capture module 110 and the data request parameter capture module 111 to identify data requests that perform below optimal levels. As discussed with more detail below, the optimization tuner 120 comprises a deep neural network that is capable of performing analysis on the received parameters to identify suboptimal performing data requests and suggest potential tuning algorithms to improve performance of the same.

The optimization module may also comprise natural language toolkits and analysis modules (such as a naïve Bayes text analysis module) to identify natural language inputs of the data requests. The natural language toolkits and analysis modules may be used by the machine learning algorithms in the optimization module 120 to identify trends and similar data requests, which may permit the system to perform tuning algorithms on a particular subsets of data requests in order to optimize the performance of the data storage environment 120. Further, the natural language toolkits may identify particular data requests that could be optimized by performing alternative data requests. For example, the may identify that the exact search results for a lengthy data query may be obtained by performing an alternative search using different query language.

FIG. 1 also depicts the data storage request input portal 11 and the data storage request output portal 12. The data storage request input portal 11 is the portal wherein a user or user computing system may input data requests to the data storage environment 100. Similarly, the data storage request output portal 12 is the portal whereby the data storage environment 100 output the results of the data request to a user or user computing system. In some embodiments, there may not be a separate data storage request output portal 12; particularly where a data request comprises operations that can be performed without any output.

Figure 2:
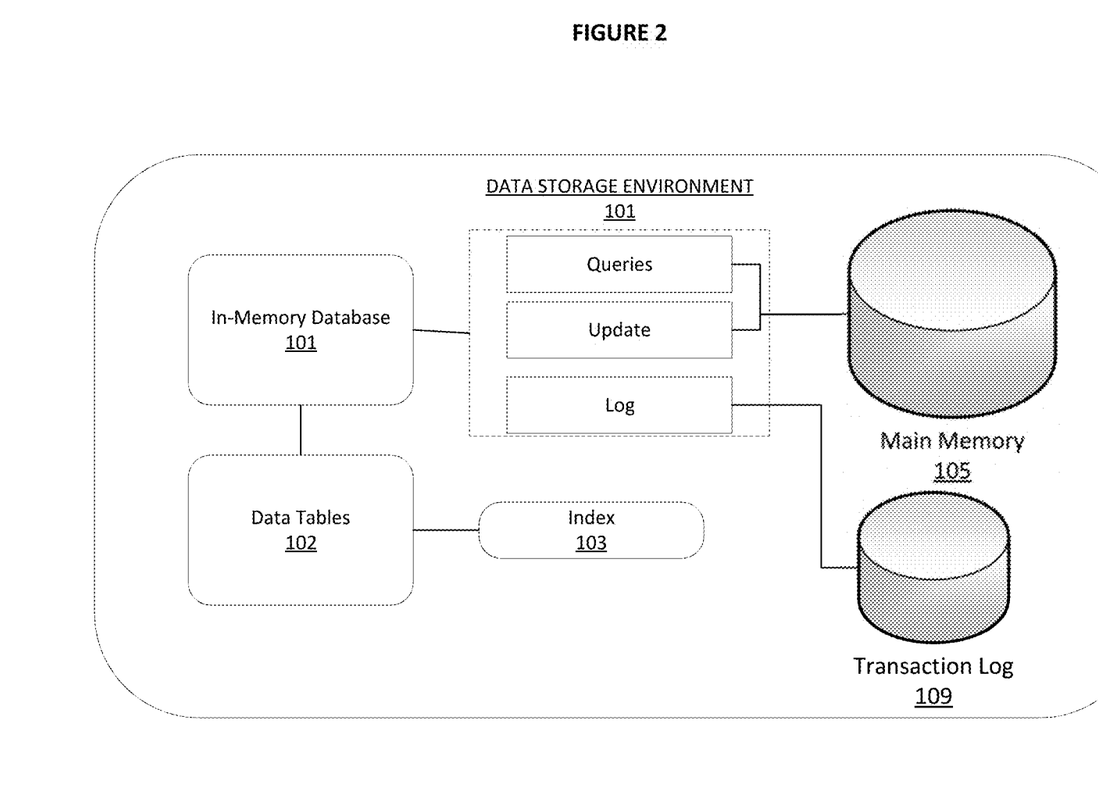
FIG. 2 is a diagram depicting an exemplary data storage environment according to embodiments of the invention.

FIG. 2 depicts an exemplary embodiment of a data storage environment in accordance with embodiments of the invention described herein. As depicted in FIG. 2, a data storage environment may comprise an in-memory database 101, one or more data tables 102, one or more indices 103, a main memory 105, and a transaction log 109.

The in-memory database 101 is a database management system that primarily relies on a main memory 105 for storing one or more data elements. The database management system may also be responsible for sorting the one or more data elements into one or more data tables 102. Additionally, the in-memory database 101 can perform operations on the one or more data elements (e.g., queries, data updates, transaction logging, etc.), which may require communication with other elements of the data storage environment 100.

The data storage environment also comprises one or more data tables 102, each of which comprises one or more columns and one or more rows where data can be sorted. The data table may comprise any type of data comprised in a number of formats. In addition, columns of the data-table may indexed or non-indexed, filtered or non-filtered, clustered or non-clustered, etc. The data tables 102 may also comprise statistic objects, such as histograms, which are generated by the in-memory database 101 and serve as representations of the data elements stored in the data storage environment 100.

As noted above, the data storage environment 100 may also comprise one or more indices 103 for the one or more data tables 102. The indices 103 are columns from the data tables that may be "sorted" or organized in order to improve searchability and computer processing speed in performing query operations on the data elements. However, not all columns of data elements in the data tables 102 will feature a corresponding index 103, as storage for each index may take up too much memory within the data storage environment 100.

The data storage environment also comprises a main memory 105, where the data elements are stored within the data storage environment 100. The main memory 105 may be unstructured or unstructured, but in any event will comprise each of the data elements that make up the data storage environment 100. Structured data elements may be sorted into the one or more tables 102, as discussed above.

The main memory 105 is in operative communication with the in-memory database 101, and as such, the in-memory database 101 can instruct the main memory 105 to perform operations on the one or more data elements. For example, as shown in FIG. 2, the in-memory database 101 may instruct the main memory to perform the operations of the data requests that submitted to the data storage environment 100. In addition, the in-memory database 102 may instruct the main memory 105 to update one or more data elements stored in the data storage environment 100.

The data storage environment 100 also comprises a transaction log 109. The transaction log 109 is a storage repository for the various data requests and other transactions that occur within the data storage environment 100. For example, when the in-memory database 102 provides an instruction to the main memory 105 in accordance with one or more data requests, the in-memory database will also transmit log data to the transaction log 109. The transaction log 109 then records this transaction.

The information recorded in the transaction log 109 and the operations performed in the main memory may be monitored by the data request and storage capture module 110 and the data request parameter capture module 111, in accordance with the processes described with respect to FIG. 1.

Figure 3:
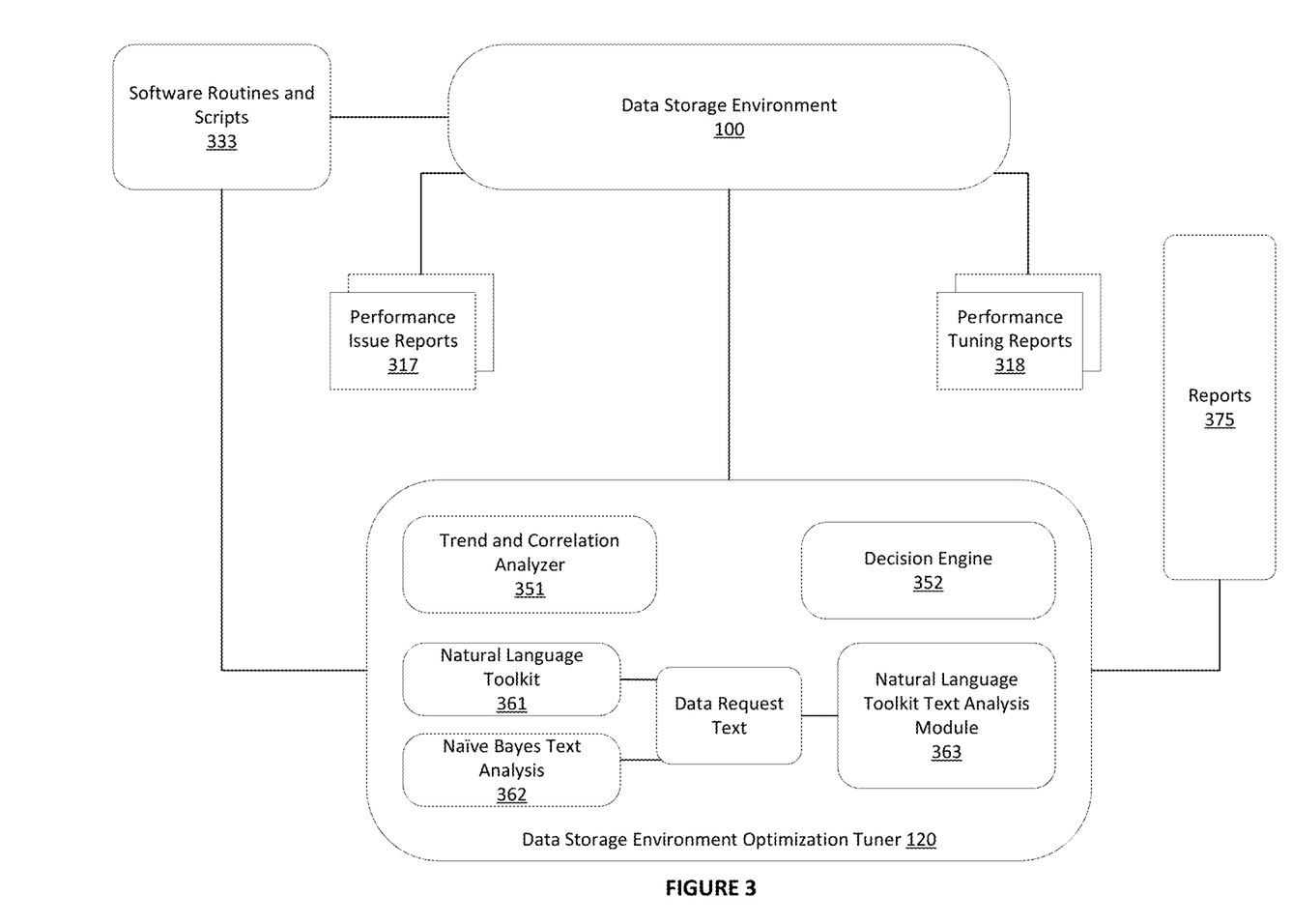
FIG. 3 is a detailed system diagram depicting an exemplary embodiment of the invention.

FIG. 3 is a detailed system diagram depicting the data storage environment optimization tuner 120 in accordance with a specific embodiment of the invention. As shown in FIG. 3, the system comprises the data storage environment 100, software routines and scripts 333, the data storage environment optimization tuner 120, and report 375.

The data storage environment 100 is substantially similar to the data storage environments described with respect to FIGS. 1 and 2, and may take the form of a structured database. As also shown in FIG. 3, the data storage environment 1 may comprise performance issue reports 317 and performance tuning reports 318. The performance issue reports may be previous reports generated by the system or the data storage environment optimization tuner 120 that identify particular performance issues in the data storage environments—e.g., excessive CPU usage or slow execution run times. The performance issue reports 317 may be used by the data storage environment optimization tuner 120 to identify appropriate tuning algorithms to resolve the particular performance issues. Similarly, the performance tuning reports 318 may be a history of performance tuning algorithms applied by the system and the resulting improvement in performance from performing the same.

The software routines and scripts 333 are a series of operations used by the system described herein in order to process and execute the data requests submitted by a user. For each data request, the system may generate an execution plan from the software routines and scripts 333 that sets out the algorithm the data storage environment 100 will execute in order to retrieve and/or perform operations on the applicable data. As described herein, the data storage environment optimization tuner 100 may perform optimization algorithms that make performance upgrades to the software routines and scripts 333, such as adding indices, restructuring data elements, or otherwise making tuning adjustments to cause the software routines and scripts 333 to perform data requests in the data storage environment 100 more efficiently.

As shown in FIG. 3, the data storage environment optimization tuner 120 may comprise a number of modules, including a trend and correlation analyzer 351, a decision engine 352, a natural language toolkit 361 and naïve Bayes text analysis module 362, and a natural language toolkit text analysis module 363.

The trend and correlation analyzer may comprise an artificial intelligence and/or deep learning neural network that identifies trends and correlations in data requests and the operation of the data storage environment 100. The trend and correlation analyzer 351 may analyze all or a subset of the data requests submitted to the data storage environment to identify which data requests or groups of data requests may cause performance problems. The data storage environment optimization tuner 120 may instruct the data storage environment to include these data requests or subset of data requests in the performance issue log 317.

The decision engine 352 is an artificial intelligence module that operates in connection with the other modules of the data storage environment optimization tuner 120 in order to identify and select optimal optimization tuning algorithms to apply to the data storage environment.

The natural language toolkit 361, naïve Bayes text analysis module 362, and natural language toolkit text analysis module 363 are modules to analyze natural language in data requests in order to identify the actual text of data requests submitted to the data storage environment 100. The modules may be used to identify potential natural language alternatives to specific data requests in order to perform more efficient routines in the software routines and scripts 333 for particular data requests.

FIG. 3 also depicts reports 375 that may be generated by the data storage environment optimization tuner 120. These reports may include summaries of the analysis and operations performed by the data storage environment optimization tuner 120, including any performance issues identified or recommendations for tuning algorithms to be implemented. The reports 375 may also include graphical representations of performance issues and or tuning algorithms.

Figure 4:
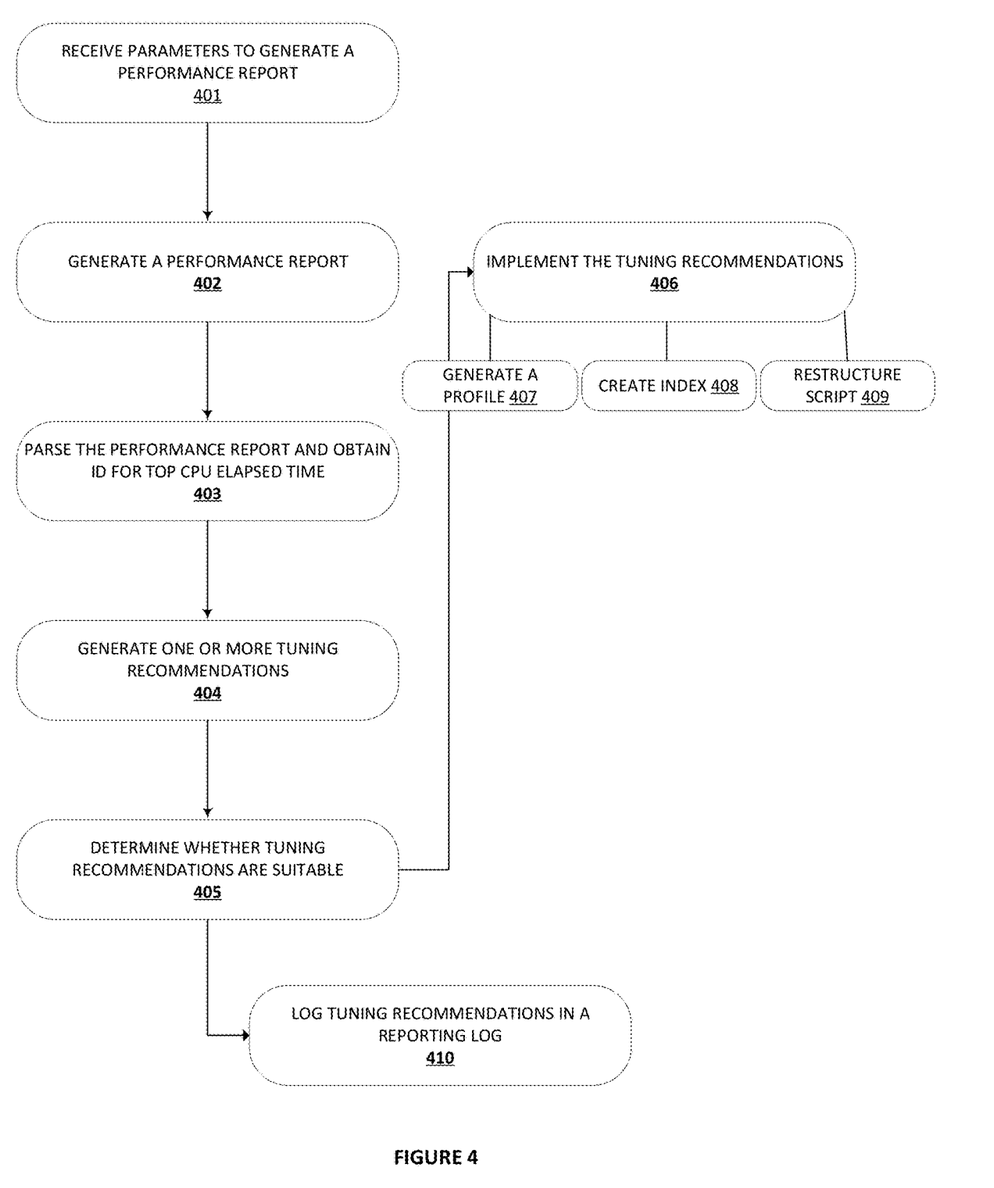
FIG. 4 is a flow chart depicting an exemplary process flow according to embodiments of the invention.
Figure 5:
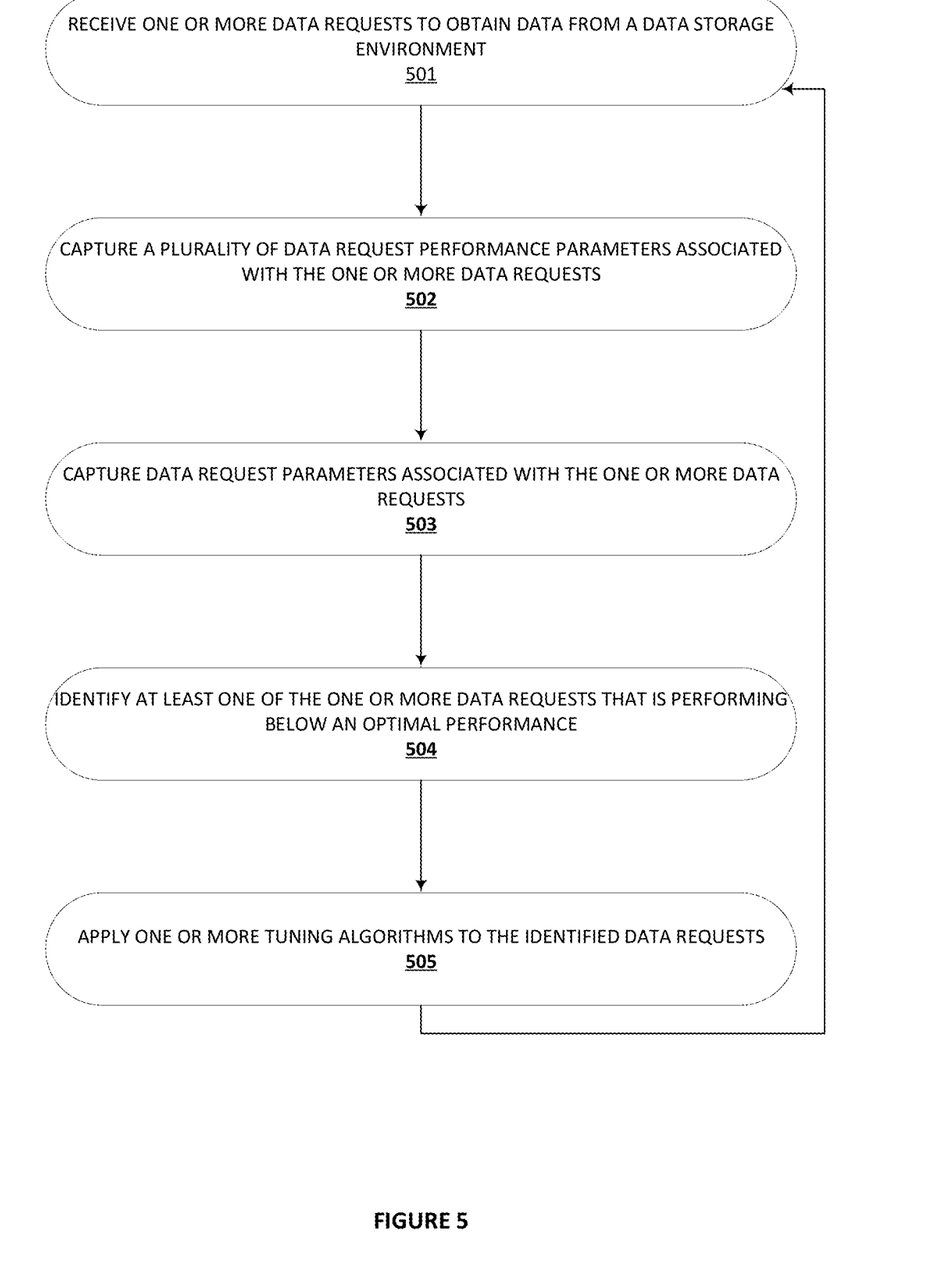
FIG. 5 is a flow chart depicting an exemplary process flow according to embodiments of the invention.

FIG. 4 depicts an exemplary process flow in accordance with embodiments of the invention as described herein. As shown at block 401, the process begins when the data storage environment 100 receives one or more data requests to obtain data from the data storage environment 100. As described above, the data request is submitted to the data storage environment 100 via the data request input portal 11. Further, it should be understood that the data request may comprise any operation capable of being performed by the data storage environment 100 and the in-memory database 101. Such requests may include searches, merges, updates, and any other common operations performed in data storage environments 100.

At block 402, the system captures a plurality of data request performance parameters associated with the one or more data requests received at block 401. The capture of block 402 may be performed by the data request and storage environment capture module. As described above, the plurality of data request performance parameters may comprise any performance parameters associated with a data request, such as total elapsed runtime, CPU time and usage, etc.

At block 403, the system captures the data request parameters associated with the one or more data requests. As noted above, this operation can be performed by the data request parameter capture module 111. In addition, the captured parameters may comprise the applicable operator (e.g., SELECT, WHERE, FROM, MERGE, etc.), the predicate and literal values associated with each query input into the data storage environment 100.

In exemplary embodiments, the system may store the applicable performance parameters in a table column, where the row includes the applicable data request parameters. In this sense, the data requests can be easily correlated to the performance parameters associated with such request. The system can then perform its analysis and neural networking operations on the table to identify trends and correlations in the performance parameters compared to the applicable data requests.

At block 404, the system identifies at least one of the one or more data request as performing below optimal performance. The system may identify such data request using neural network analysis to compare the applicable data request to other similar requests and note that the operating parameters are not optimized (e.g., they require more CPU power than similarly performed data requests). Similarly, the system may implement artificial intelligence algorithms to determine that a data request is suboptimal by performing simulations on an alternative data request that would yield more optimal performance. As discussed above, the system may implement natural language processing techniques in order to simulate the performance of similar data requests using alternative natural language approaches.

Once the system has identified one or more data requests that is performing at less than optimal performance, the system may be configured to generate a report for output to a user display. The report may include visual representations of trends identified by the neural network analysis. The report may also incorporate exceptions identified by the optimization module 120, as well as recommendations for optimizing the performance of the data storage environment 100.

At block 405, the system applies one or more tuning algorithms to the data storage environment 100 and/or the one or more data requests. The tuning algorithm may comprise any algorithm designed to improve the performance of the one or more data requests identified by the system as performing below optimal performance (as may be determined against a predetermined threshold, a maximum theoretical performance, etc.). Exemplary embodiments of the present invention may implement tuning algorithms comprising creating new indices for unindexed data columns, creating new database parameter sets, or restructuring one or more databases or one or more data tables 103 in the data storage environment 100.

As will be appreciated by one of ordinary skill in the art, the present invention may be embodied as an apparatus (including, for example, a system, a machine, a device, a computer program product, and/or the like), as a method (including, for example, a computer-implemented process), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with software-defined radio systems and machine learning algorithms to be performed thereon.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broader invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for optimizing data requests in an electronic data storage environment, the system comprising:
  one or more processor components;
  one or more memory components operatively coupled to the one or more processor components;
  computer-readable instructions stored on the one or more memory components and configured to cause the one or more processor components to:
    receive one or more data requests, wherein a data request is a request to perform an operation on data stored in a data storage environment;
    capture one or more data request performance parameters associated with the one or more data requests;
    capture one or more data request parameters associated with the one or more data requests;
    store the one or more captured data request performance parameters and one or more data request parameters in a data table;
    identify at least one of the one or more data requests that is performing below an optimal performance; and
    apply a tuning algorithm to the one or more identified data requests, wherein the tuning algorithm comprises at least one of adding one or more indices to the electronic data storage environment, restructuring one or more data requests, or creating a new data storage environment parameter set,
    wherein identifying at least one data request that is performing below an optimal performance comprises:
      implementing natural language processing on the one or more data requests;
      identifying, using a machine learning algorithm, a second data request wherein the second data request comprises one or more alternative data requests;
      performing one or more simulations on the second data request;
      capturing the one or more data request performance parameters associated with the second data request;
      capturing the one or more data request parameters associated with the second data request;

comparing the data request parameters of the at least one data request to the data request parameters of the second data request; and comparing the one or more data request performance parameters associated with the at least one data request to the second data request performance parameters associated with second data request identifying each of the one or more data requests having similar data request parameters to the second data request and sub-optimal performance to the second data request.

2. The system of claim 1, wherein capturing one or more data request parameters associated with the one or more data requests comprises capturing at least one of an operator, a predicate, or a literal associated with the one or more data requests.

3. The system of claim 1, wherein capturing one or more data request performance parameters comprises capturing a total elapses runtime associated with the one or more data requests.

4. The system of claim 1, wherein the system is further configured to generate a report and display the report on a user display.

5. A computer program product for optimizing data requests in an electronic data storage environment, the computer program product comprising at least one non-transitory computer readable medium comprising computer readable instructions, the instructions comprising instructions to:

receive one or more data requests, wherein a data request is a request to perform an operation on data stored in a data storage environment;

capture one or more data request performance parameters associated with the one or more data requests;

capture one or more data request parameters associated with the one or more data requests;

store the one or more captured data request performance parameters and one or more data request parameters in a data table;

identify at least one of the one or more data requests that is performing below an optimal performance; and apply a tuning algorithm to the one or more identified data requests, wherein the tuning algorithm comprises at least one of adding one or more indices to the electronic data storage environment, restructuring one or more data requests, or creating a new data storage environment parameter set, wherein identifying at least one data request that is performing below an optimal performance comprises:

implementing natural language processing on the one or more data requests;

identifying, using a machine learning algorithm, a second data request wherein the second data request comprises one or more alternative data requests;

performing one or more simulations on the second data request;

capturing the one or more data request performance parameters associated with the second data request;

capturing the one or more data request parameters associated with the second data request;

comparing the data request parameters of the at least one data request to the data request parameters of the second data request; and comparing the one or more data request performance parameters associated with the at least one data request to the second data request performance parameters associated with second data request identifying each of the one or more data requests having similar data request parameters to the second data request and sub-optimal performance to the second data request.

6. The computer program product of claim 5, wherein capturing one or more data request parameters associated with the one or more data requests comprises capturing at least one of an operator, a predicate, or a literal associated with the one or more data requests.

7. The computer program product of claim 5, wherein capturing one or more data request performance parameters comprises capturing a total elapses runtime associated with the one or more data requests.

8. The computer program product of claim 5, wherein the computer program product is further configured to generate a report and display the report on a user display.

9. A computer implemented method for optimizing data requests in an electronic data storage environment comprising:

receiving one or more data requests, wherein a data request is a request to perform an operation on data stored in a data storage environment;

capturing one or more data request performance parameters associated with the one or more data requests;

capturing one or more data request parameters associated with the one or more data requests;

storing the one or more captured data request performance parameters and one or more data request parameters in a data table;

identifying at least one of the one or more data requests that is performing below an optimal performance; and applying a tuning algorithm to the one or more identified data requests, wherein the tuning algorithm comprises at least one of adding one or more indices to the electronic data storage environment, restructuring one or more data requests, or creating a new data storage environment parameter set, wherein identifying at least one data request that is performing below an optimal performance comprises:

implementing natural language processing on the one or more data requests;

identifying, using a machine learning algorithm, a second data request wherein the second data request comprises one or more alternative data requests;

performing one or more simulations on the second data request;

capturing the one or more data request performance parameters associated with the second data request;

capturing the one or more data request parameters associated with the second data request;

comparing the data request parameters of the at least one data request to the data request parameters of the second data request; and comparing the one or more data request performance parameters associated with the at least one data request to the second data request performance parameters associated with second data request; and identifying each of the one or more data requests having similar data request parameters to the second data request and sub-optimal performance to the second data request.

10. The computer-implemented method of claim 9, wherein capturing one or more data request parameters associated with the one or more data requests comprises capturing at least one of an operator, a predicate, or a literal associated with the one or more data requests.

11. The computer-implemented method of claim 9, wherein capturing one or more data request performance parameters comprises capturing a total elapses runtime associated with the one or more data requests.

* * * * *